April 1, 1969          G. KRUGER          3,436,243
RUBBER PARTICLES COATED WITH STARCH AND TALC
Filed Jan. 14, 1965
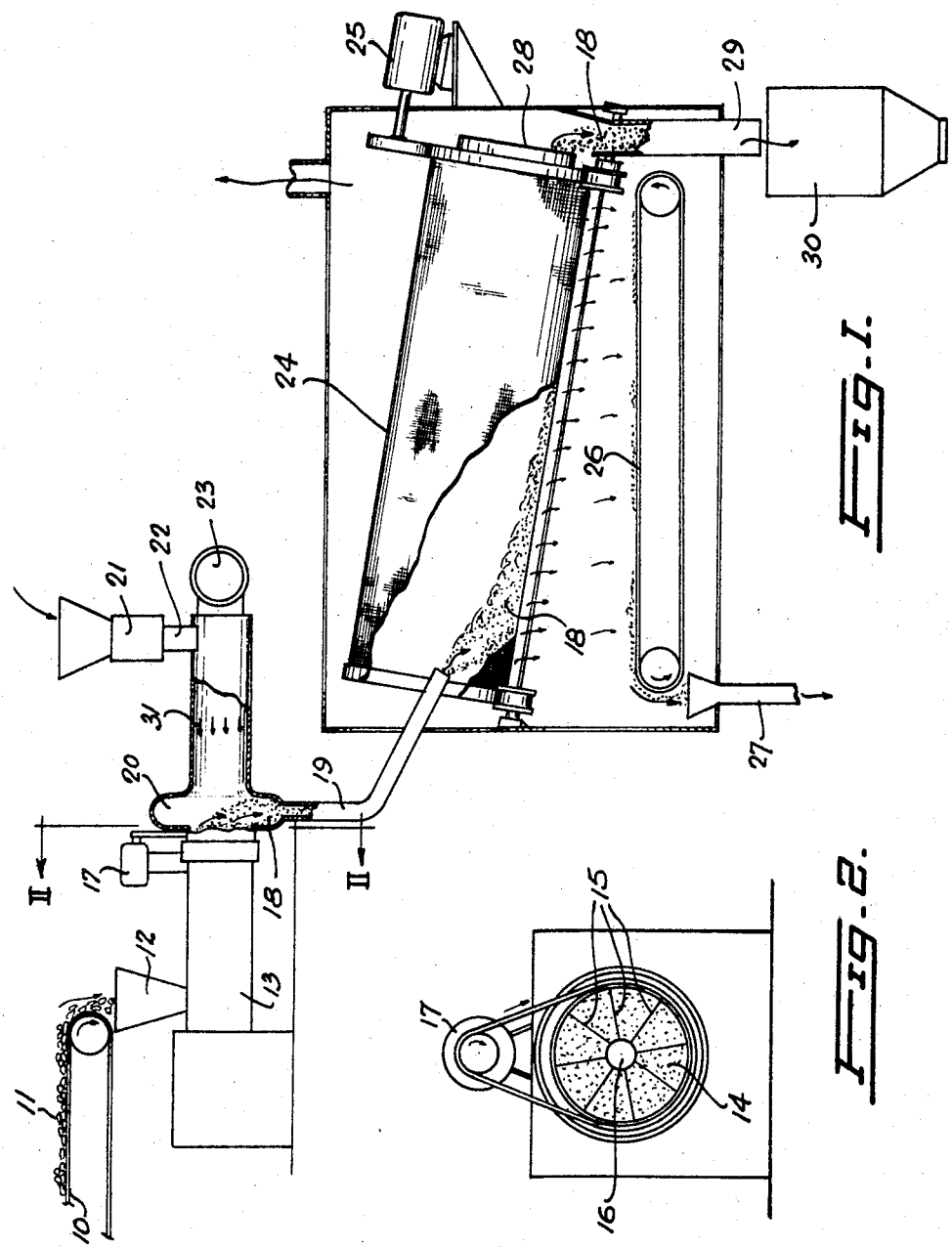
Inventor
Gerhard Kruger
By Stevens Davis, Miller & Mosher
Attorney

United States Patent Office 3,436,243
Patented Apr. 1, 1969

3,436,243
RUBBER PARTICLES COATED WITH STARCH AND TALC
Gerhard Kruger, Weinheim an der Bergstrasse, Germany, assignor to Polymer Corporation Limited, Sarnia, Ontario, Canada, a body corporate
Filed Jan. 14, 1965, Ser. No. 425,446
Claims priority, application Canada, Feb. 4, 1964, 894,818
Int. Cl. B44d 1/22; B44c 1/08
U.S. Cl. 117—16     5 Claims

ABSTRACT OF THE DISCLOSURE

Rubber particles are coated with a mixture of talc and corn starch to render them less tacky and easier to handle and store.

---

This invention relates to improvements in the coating of pellets of natural or synthetic rubber or like tacky synthetic material, which, for the purpose of the present disclosure, will be considered as falling within the general term "rubber." Great difficulty has been experienced in the past in handling pellets of such materials for the purpose of bagging for storage, transportation and the like. At the outset the pellets show a strong tendency to stick together, and this effect is aggravated by the passage of time and the pressure due to the stacking of bags of pellets.

It would be convenient if the rubber that is received at an elevated temperature from the dryer at the final stage of a synthetic rubber manufacturing process could be extruded and cut into comparatively small pellets and then simply bagged for transportation, with a reasonable expectation that when the rubber came to be used it would still be substantially in non-cohered pellet form. If the pellets are left uncoated, this desirable result is seldom achievable in practice. Some rubbers form lumpy agglomerations of pellets; others virtually completely lose their pellet form and revert to an amorphous mass. In almost all instances the free flowing character of a particulate solid is lost. In view of these difficulties various proposals have been made in the past for coating the pellets with materials designed to inhibit their tendency to stick together and agglomerate. None of these materials has been entirely successful.

The invention relates to a method of coating the pellets; and to pellets that have been coated with such a composition.

It has now been discovered that improved storage properties are obtainable for rubber pellets by coating them with a composition comprising a mixture of talc and starch. Applied alone, neither of these materials is entirely satisfactory for the powdering of rubber pellets, but together they form a composition with much enhanced properties, since each ingredient is found to modify the undesirable properties of the other ingredient while contributing its own desirable properties. More specifically, the presence of the talc inhibits absorption of water by the starch, and the presence of the starch inhibits absorption of the talc into the rubber. If talc is used alone, it provides some improvement over unpowdered rubber, but it has the severe disadvantage that too much talc is picked-up and held tightly adsorbed by the rubber surfaces. A talc weight as high as 8 to 10% of the rubber weight may typically be adsorbed in this way. Such a large pick-up of talc, which is retained far too firmly to be simply brushed off, represents a substantial disadvantage, both in the amount of talc that has to be supplied and in connection with the subsequent use of the rubber. The consumer who receives the rubber pellets for the purposes of some subsequent manufacturing process, wishes to receive the pellets in substantially free flowing form, but he has no desire to receive 8 to 10% talc. Even if the presence of the talc is taken into consideration in assessing the weight of rubber consigned, it may still represent an undesirable ingredient in the subsequent process. Although generally inert, talc in excessive quantities may upset the proper functioning of the subsequent process or the appearance and properties of the final product.

It follows that any reduction obtain able in the amount of talc carried forward into bagged rubber pellets coated with talc, would have substantial advantage, both in economy of the talc itself and in yielding a commercially more desirable product, always provided such reduction can be achieved without any significant reduction in the talc's ability to coat the pellets sufficiently to prevent their sticking together. Just this effect is achieved by the addition of starch to the talc. It has been found experimentally that the pick-up of powder is reduced drastically, from the value of 8 to 10% mentioned above, to a value of the order of 0.5 to 2% by weight. Under most conditions the pick-up can be held to around 1% or less. This action is believed to be due to the larger particle size of the starch.

At the same time, the presence of the talc in the mixture prevents the starch absorbing an objectionable amount of water. Alone starch would absorb water, swell and smear.

Bearing these considerations in mind, it will be apparent that the optimum ratio of talc to starch will vary with both machine and atmospheric conditions, especially temperature and humidity. It will also vary with the nature of the rubber. The overall range of proportions can be set approximately as from equal parts by weight of talc and starch (1:1) to six parts of talc to one of starch (6:1). The optimum range for most normally encountered conditions is from 2:1 to 4:1, and the preferred value usually around 3:1, with the talc being the majority ingredient in all instances. In view of the parts played by the respective ingredients in achieving the combined effect, as explained above, it will be evident in what manner a given composition should be varied within these ranges under prevailing conditions. If it is found that the starch is absorbing an objectionable amount of water, the talc to starch ratio should be increased. If an undesirable amount of talc is being picked up by the rubber, the ratio should be decreased.

The preferred form of starch is corn starch, but other starches may be employed, such as potato, wheat or rice starch, provided of course, it is available in a suitable powdered form.

The accompanying drawings illustrate by way of example one form of apparatus for the application to rubber pellets of a powdering composition in accordance with the present invention.

FIGURE 1 is a side view, partly cut away, of the entire apparatus; and

FIGURE 2 is a section on the line II—II in FIGURE 1.

Raw rubber in the form of "crumb," that is, smallish lumps of random size, is received on a conveyor 10 from the dryer of a rubber manufacturing plant not otherwise shown. The rubber crumb 11 is conveyed to the hopper 12 of an extruder 13. This extruder is generally conventional in form, consisting of an elongated motor-driven screw which forces the rubber through circular orifices in an end plate 14 (FIGURE 2) where the extrudate is cut into pellets by a series of rotary cutters in the form of steel wires or knives 15 mounted on the end of the shaft 16 of the extruder 13. The shaft 16 is driven from motor 17. Typically the orifices in the face plate 14 might have a diameter of 2 to 4 mm., and the wires 15 might be rotated so as to cut the extrudate into pellets also about 2 to 4 mm. in length. Obviously, these dimensions can be widely varied as desired.

FIGURE 1 shows cut pellets 18 dropping into a conduit 19 for transfer to the next stage in the apparatus. While the pellets 18 are being extruded and cut off by the knives 15, their exposed surfaces are coated with the powdering composition in a chamber 20. The powdering composition (talc and cornstarch in proportions as described above) is supplied from a container 21 through a tube 22 (by which the amount of powder can be controlled) and is blown against the face plate 14 by a powerful blower 23 in the manner indicated by the arrows 31 in FIGURE 1. The blower 23 forces the powder continuously against the face plate 14 and into intimate contact with the pellets being formed thereon. The pellets are continuously surrounded by a thick mist of powder. The ratio of air to powder can conveniently be about 10 to 1.

It is desirable that the powder be brought into intimate contact with the individual surfaces of the pellets as the extruding process proceeds and that a coating of powder be already formed on the exposed surfaces of each pellet before it is cut off by the knives 15. The presence of a dense mist of powder in the chamber 20 also ensures the application of some powder to the rear surface of each pellet as it is separated from the ribbon of extrudate.

The powdered pellets 18 are transferred by conduit 19 to a drum 24 where any excess of powder applied in the chamber 20 is removed. The drum 24 is of mesh construction and is preferably made of a synthetic resinous material such as nylon. It is rotated by a suitable mechanism represented diagrammatically as a motor drive 25. Excess powder is shaken off the pellets 18 in the drum 24 and falls through the mesh sides of the drum onto a conveyor 26 by which it is returned through a conduit 27 to the container 21. The pellets 18 spill over a lip 28 at the lower end of the drum 24 and travel through a conduit 29 to a hopper 30 for the bagging or other machines (not further shown) to which the pellets are to be consigned.

In the dusting chamber 20 there is a ratio of about 10 to 1 rubber to powder. By the time the pellets 18 have reached the lower end of the drum 24, the amount of powder adhering to the surfaces of the pellets is only about 1% of the total rubber weight. This amount will obviously vary in accordance with the nature of the rubber surface and the size of the pellets.

As an alternative to the apparatus described, the powdering compound may be applied by letting the pellets fall from the extruding head onto a vibrating screen and blowing or sprinkling the composition onto the pellets while on the screen.

The process may be applied to various rubbers including both synthetic and natural types such as homopolymers of conjugated diolefines, e.g., homopolyisoprene, homopolybutadiene-1,3 and homopoly-2-chlorobutadiene-1,3, etc., copolymers of conjugated diolefins with copolymerizable monomers e.g., copolymers of butadiene-1,3 with styrene, butadeine-1,3 with acrylonitrile, butadiene-1,3 with isobutylene, isoprene with sytrene, isoprene with acrylonitrile, isoprene with isobutylene, etc., and copolymers of monoolefinic monomers such as copolymers of ethylene with propylene and copolymers of ethylene with propylene and dicyclopentadiene etc. Best results will be obtained with rubbers which are not characterized by cold flow at ambient temperatures. The process may also be applied to tacky compounded rubbers containing various compounding ingredients such as filters, softeners, tackifiers, accelerators, vulcanizing agents, coloring pigments, other soft or hard or resinous polymers etc. when it is desired to use the compounds in comminuted particulate form.

While the coating powder composition may broadly be composed of any mixture comprised of a minor proportion of a larger particle size organic powder and a major proportion of a smaller particle size inorganic powder, the particle sizes being such that at least 50% of the particles of each component in the mixture will pass through a 200 mesh U.S. Standard screen, the organic component is preferably a polysaccharide or a derivative thereof such as starch, cellulose, alginate, pectin, etc. and the inorganic component is preferably a silicate or derivative thereof such as talc, diatomaceous earth, asbestos, silica, mica, etc. A mixture where 95% of the particles of each component will pass through a 200 mesh screen and 90% through a 325 mesh screen is preferred with starch and talc being the most preferred components.

The following is a specific example of the invention.

A mixture of talc, magnesium silicate treated to contain about 1% of a light hydrocarbon oil to render it less dusty and cornstarch in the ratio of approximately 3:1 by weight was employed. The oil is not an essential ingredient; it is merely convenient, as it makes the powder easier to handle.

The talc was of commercial quality having a particle size such that at least 93% by weight passed through a 325 mesh U.S. Standard screen (44 micron diameter openings) and at least 98% passed through a 200 U.S. Standard mesh screen (74 micron openings). Its specific gravity was 2.7 to 2.8 and its moisture content less than 3% microscope measurements gave an average particle size of 4.25 microns.

The cornstarch was ordinary commercial quality with a particle size somewhat larger than the talc, but still substantially powdery to the touch. 97.3 weight percent passed through the 325 mesh screen and 99.9% through the 200 mesh screen. Microscope measurements indicated an average particle size of 7.15 microns. Its specific gravity was about 1.5.

The pellets were extruded at a temperature in the range of approximately 225 to 300° F. This is believed to be the preferred range, although the temperature is not especially critical, and will normally be set by factors other than the dusting composition used e.g. Mooney viscosity and ease of extrusion of the particular rubber being handled. The higher the Mooney, the higher is the temperature required for extruding and dusting to obtain optimum results. It is anticipated that the temperature of the rubber when the dusting composition is applied may fall anywhere in the range of 150 to 300° F.

The pellet size was approximately 4 mm. both in length and diameter.

The following rubbers have been pelletized and dusted successfully by the composition of the invention:

(1) Butadiene-1,3/styrene copolymer prepared by aqueous emulsion polymerization. Percent bound styrene=23.5. Mooney viscosity=52 (ML–4–212° F.).

(2) Butadiene-1,3/styrene copolymer prepared by aqueous emulsion polymerization. Percent bound styrene=23.5. Mooney viscosity=45 (ML–4–212° F.). This rubber contained 37.5 parts by weight per 100 parts by weight of rubber, of an aromatic extender oil and the Mooney viscosity was determined on the rubber/oil mixture. When the oil is not present, the rubber has a Mooney viscosity of about 150 (ML–4–212° F.). This latter rubber was also pelletized and dusted successfully.

(3) Two isoprene/isobutylene copolymers prepared by aqueous solution polymerization with a Friedel-Crafts catalyst at about minus 145° F. These copolymers had ML–8–212° F. Mooney viscosities of 45 and 75 and mole percent unsaturations of 2.2 and 1.6 respectively.

(4) Butadiene - 1,3/acrylonitrile copolymer prepared by aqueous emulsion polymerization. Percent bound acrylonitrile=34.0. Mooney viscosity=47 (ML–4–212° F.).

(5) A 2-chloro-butadiene-1,3 homopolymer prepared by aqueous emulsion polymerization. Mooney viscosity= about 50 (ML–4–212° F.).

(6) Natural rubber crepe No. 1. This may be considered to be a homopolyisoprene.

(7) Butadiene - 1,3/styrene copolymer prepared by aqueous emulsion polymerization. Percent bound styrene=28.0. Mooney viscosity=47 (ML–4–212° F.).

(8) Butadiene - 1,3/acrylonitrile copolymer prepared by aqueous emulsion polymerization. Percent bound acrylonitrile=38.5. Mooney viscosity=83 (ML-4-212° F.).

(9) Butadiene - 1,3/acrylonitrile copolymer prepared by aqueous emulsion polymerization. Percent bound acrylonitrile=34.0. Mooney viscosity=47 (ML-4-212° F.).

(10) A 96% cis-1,4 polybutadiene-1,3 prepared by solution polymerization with a stereospecific catalyst. Mooney viscosity=45 (ML-4-212° F.).

Equal portions of the dusted pellets obtained from each sample were placed loosely into four 4 inch diameter beakers and two of each were weighted with a weight equivalent to a 5 foot head of pellets (calculated at 35 lbs. per cubic foot). A weighted and unweighted sample of each was allowed to stand at 70° F. and at 150° F. for four days. None of the unweighted samples showed any signs of sticking. The weighted samples stuck slightly but a sudden jar of the beakers or a stirring action with a finger loosened them into free flowing discreet pellets again. Undusted pellets stick firmly together on contact even when cold and even when unweighted.

The embodiments of the invention in which an exclusive property or privilege is claimed are defined as follows:

1. A body of inherently tacky rubber in the form of particles, individual said particles having a surface coating to reduce their tendency to stick together, said coating consisting of a powdery composition comprising a mixture of starch and talc, the proportion of starch to talc being in the range of 1:1 to 1:6 by weight, the average particle size of the starch being larger than the average particle size of the talc, and the rubber particles carrying on their surfaces an amount by weight of said powdery composition of between 0.5 and 2% of the rubber weight.

2. A body as claimed in claim 1, wherein the starch is corn starch and the particle size of each component of the powdery composition is such that at least 95% by weight will pass through a 200 mesh U.S. Standard screen and 90% by weight will pass through a 325 mesh U.S. Standard screen.

3. A body as claimed in claim 1, wherein said proportion is in the range of 1:2 to 1:4.

4. A body as claimed in claim 1 wherein the tacky rubber comprises a polymer containing an olefine polymerized into its molecular structure and wherein the tacky rubber does not have any significant cold flow at ambient temperatures.

5. A body as claimed in claim 1 wherein the tacky rubber comprises a polymer containing a conjugated diolefine polymerized into its molecular structure and wherein the tacky rubber does not have any significant cold flow at ambient temperature.

References Cited

UNITED STATES PATENTS

| | | | |
|---|---|---|---|
| 2,096,296 | 10/1937 | Fromm | 117—137 |
| 2,315,924 | 4/1943 | Bertram | 117—100 X |
| 2,879,173 | 3/1959 | Yacoe | 117—100 X |
| 2,895,939 | 7/1959 | Stober et al. | 260—45.5 |

WILLIAM D. MARTIN, *Primary Examiner.*

U.S. Cl. X.R.

117—100, 138.8